(12) United States Patent
Matsunaga et al.

(10) Patent No.: US 10,215,068 B2
(45) Date of Patent: Feb. 26, 2019

(54) MUFFLER FOR CONSTRUCTION MACHINE

(71) Applicant: KOBELCO CONSTRUCTION MACHINERY CO., LTD., Hiroshima-shi (JP)

(72) Inventors: Hidenori Matsunaga, Hiroshima (JP); Masanori Takemoto, Hiroshima (JP); Tomotaka Kita, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 212 days.

(21) Appl. No.: 15/112,810

(22) PCT Filed: Jan. 8, 2015

(86) PCT No.: PCT/JP2015/050320
§ 371 (c)(1),
(2) Date: Jul. 20, 2016

(87) PCT Pub. No.: WO2015/111433
PCT Pub. Date: Jul. 30, 2015

(65) Prior Publication Data
US 2016/0341083 A1 Nov. 24, 2016

(30) Foreign Application Priority Data

Jan. 24, 2014 (JP) ................. 2014-010931

(51) Int. Cl.
*F01N 1/08* (2006.01)
*F01N 13/02* (2010.01)
(Continued)

(52) U.S. Cl.
CPC ............ *F01N 1/083* (2013.01); *F01N 1/085* (2013.01); *F01N 1/24* (2013.01); *F01N 3/021* (2013.01);
(Continued)

(58) Field of Classification Search
CPC . F01N 1/083; F01N 1/085; F01N 1/24; F01N 3/021; F01N 3/103; F01N 13/02;
(Continued)

(56) References Cited

U.S. PATENT DOCUMENTS 2,798,569 A * 7/1957 Fischer, Jr. ............. F01N 1/006
181/252
5,887,426 A    3/1999 Brück
(Continued)

FOREIGN PATENT DOCUMENTS

CN    1156494 A    8/1997
CN    1509371 A    6/2004
(Continued)

OTHER PUBLICATIONS

Extended European Search Report dated Feb. 8, 2017 in Patent Application No. 15740675.2.
(Continued)

*Primary Examiner* — Phutthiwat Wongwian
*Assistant Examiner* — Kelsey Stanek
(74) *Attorney, Agent, or Firm* — Oblon, McClelland, Maier & Neustadt, L.L.P.

(57) ABSTRACT

A muffler including an inlet member, an outlet member, an exhaust-gas cleaning device including an exhaust-gas cleaning material, the exhaust-gas cleaning device including a first inlet side coupling section and a first outlet side coupling section detachably coupled to the inlet member and the outlet member by couplers, and an intermediate member including a second inlet side coupling section and a second outlet side coupling section detachably coupled to the inlet member and the outlet member by couplers same as the couplers, instead of the exhaust-gas cleaning device. The intermediate member is a cylinder body allowing exhaust gas in the inlet member to flow directly to the outlet member (Continued)

without passing through the exhaust gas cleaning material, and includes a resistance generation section providing the intermediate member with exhaust resistance substantially equal to that of the exhaust-gas cleaning device.

6 Claims, 4 Drawing Sheets

(51) Int. Cl.
| | | |
|---|---|---|
| F01N 13/08 | (2010.01) | |
| F01N 13/18 | (2010.01) | |
| F01N 1/24 | (2006.01) | |
| F01N 3/021 | (2006.01) | |
| F01N 3/10 | (2006.01) | |

(52) U.S. Cl.
CPC .............. *F01N 3/103* (2013.01); *F01N 13/02* (2013.01); *F01N 13/082* (2013.01); *F01N 13/1855* (2013.01); *F01N 2260/14* (2013.01); *F01N 2410/10* (2013.01); *F01N 2450/24* (2013.01); *F01N 2450/40* (2013.01); *F01N 2590/08* (2013.01); *Y02T 10/20* (2013.01)

(58) Field of Classification Search
CPC ............... F01N 13/082; F01N 13/1855; F01N 2260/14; F01N 2410/10; F01N 2450/24; F01N 2450/40; F01N 2590/08; Y02T 10/20
USPC .......................................................... 60/324
See application file for complete search history.

(56) References Cited

U.S. PATENT DOCUMENTS

| | | | |
|---|---|---|---|
| 6,457,551 B1 * | 10/2002 | Chang | .................... F01N 1/003 |
| | | | 181/242 |
| 2003/0000058 A1 | 1/2003 | Mayfield | |
| 2004/0118282 A1 | 6/2004 | Alger et al. | |
| 2006/0085980 A1 | 4/2006 | Mayfield | |
| 2011/0023472 A1 | 2/2011 | Saito et al. | |
| 2011/0030353 A1 | 2/2011 | Kamiya et al. | |
| 2017/0009683 A1 | 1/2017 | Mitsuda | |

FOREIGN PATENT DOCUMENTS

| | | | |
|---|---|---|---|
| EP | 2 314 835 A1 | 4/2011 | |
| EP | 3 121 403 A1 | 1/2017 | |
| GB | 2 252 129 A | 7/1992 | |
| GB | 2252129 A * | 7/1992 | ............. F01N 1/006 |
| JP | 2005-155424 A | 6/2005 | |
| JP | 2015-17602 A | 1/2015 | |
| WO | 2010/018722 A1 | 2/2010 | |
| WO | 2010/026864 A1 | 3/2010 | |
| WO | WO 2012/168540 A1 | 12/2012 | |

OTHER PUBLICATIONS

Office Action dated Dec. 20, 2017 in European Patent Application No. 15 740 675.2, citing document AQ therein, 4 pages.
Combined Office Action and Search Report dated Nov. 28, 2017 in Chinese Patent Application No. 201580003383.0 (with English Summary obtained from the EPO global dossier and English translation of categories of cited documents) citing documents AO, AP and AR therein, 11 pages.
International Search Report dated Mar. 24, 2015 in PCT/JP2015/050320 filed Jan. 8, 2015.

* cited by examiner

MUFFLER FOR CONSTRUCTION MACHINE

TECHNICAL FIELD

The present invention relates to a muffler provided in an exhaust system of an engine in a construction machine such as a shovel.

BACKGROUND ART

A construction machine such as a shovel is provided with a muffler including an exhaust-gas cleaning apparatus for removing toxic substances in exhaust gas discharged from a diesel engine as a standard specification. For example, WO2010/026864 (Patent Literature 1) discloses an exhaust-gas cleaning apparatus including an upstream cylinder body, a downstream cylinder body, and a filter cylinder body interposed between the upstream cylinder body and the downstream cylinder body. In the filter cylinder body, a DPF (Diesel Particulate Filter) is provided to remove a PM (Particulate Matter) and the like included in exhaust gas. A silencer cylinder body of an outflow pipe is inserted into the downstream cylinder body.

When the construction machine including such an exhaust-gas cleaning apparatus is operated in a region without an exhaust gas regulation, there is a possibility that sulfur contained in fuel used in the region exceeds an allowable content of the exhaust-gas cleaning apparatus to thereby disable the DPF from being regenerated.

Exchanging the engine to an engine of an exhaust gas non-regulation specification as measures against the problem requires design and manufacturing of a new engine corresponding to a device layout in an engine room or substantial remodeling and component replacement on a construction machine main body side, involving respective marked increases in costs and man-hours.

CITATION LIST

Patent Literature

Patent Literature 1: WO2010/026864

SUMMARY OF INVENTION

It is an object of the present invention to provide a muffler for a construction machine, the muffler being switchable between a state having an exhaust-gas cleaning function and a state adaptable to an exhaust-gas-non-regulation machine while keeping an engine adapted to an exhaust gas regulation be usable. The muffler provided by the present invention includes: an inlet member that receives exhaust gas from an engine; an outlet member that discharges the exhaust gas received by the inlet member; an exhaust-gas cleaning device including an exhaust gas cleaning material having a function of cleaning the exhaust gas, the exhaust-gas cleaning device including a first inlet side coupling section and a first outlet side coupling section capable of being detachably coupled to the inlet member and the outlet member, respectively, by couplers, in such respective positions that the exhaust-gas cleaning device is interposed between the inlet member and the outlet member so as to allow the exhaust gas in the inlet member to flow to the outlet member through the exhaust gas cleaning material; and an intermediate member other than the exhaust-gas cleaning device, the intermediate member including a second inlet side coupling section and a second outlet side coupling section capable of being detachably coupled to the inlet member and the outlet member, respectively, by couplers same as the couplers, in such respective positions that the intermediate member, in place of the exhaust-gas cleaning device, is interposed between the inlet member and the outlet member. The intermediate member is a tubular body that allows the exhaust gas in the inlet member to flow directly to the outlet member without passing through the exhaust gas cleaning material in a state in which the second inlet side coupling section and the second outlet side coupling section are connected to the inlet member and the outlet member, respectively. The intermediate member includes a resistance generation section that generates ventilation resistance so as to provide the intermediate member with exhaust resistance substantially equivalent to exhaust resistance of the exhaust-gas cleaning device.

DESCRIPTION OF EMBODIMENTS

First to fourth embodiments of the present invention are explained with reference to the drawings.

Figure 6:
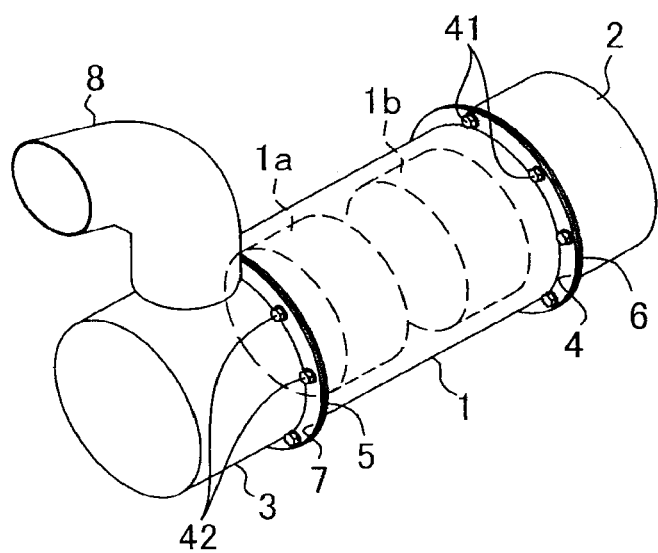
FIG. 6 is a perspective view showing a state in which an exhaust-gas cleaning device is incorporated in the muffler according to the first embodiment of the present invention.
Figure 7:
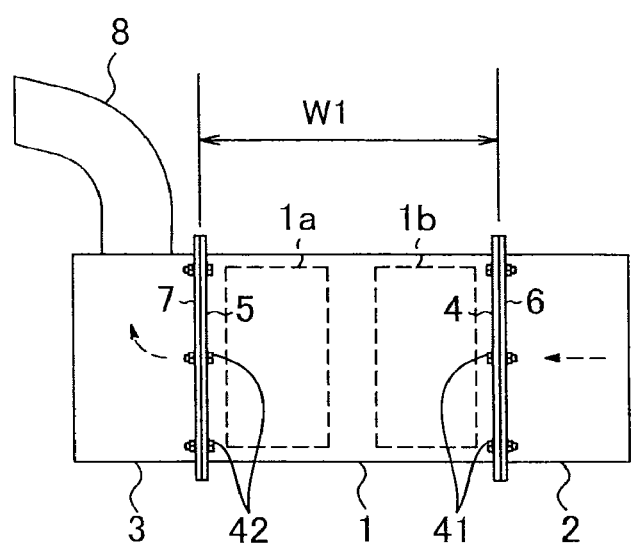
FIG. 7 is a front view showing the state shown in FIG. 6.

Each of mufflers according to the embodiments includes an inlet side silencer 2 that receives exhaust gas from an engine, an outlet side silencer 3 functioning as an outlet member that discharges the exhaust gas received by the inlet side silencer 2, a cylindrical exhaust-gas cleaning device 1 capable of being interposed between the inlet side silencer 2 and the outlet side silencer 3 as shown in FIG. 6 and FIG. 7; and a cylindrical intermediate member 11 capable of being interposed between the inlet side silencer 2 and the outlet side silencer 3 in place of the exhaust-gas cleaning device 1. The outlet side silencer 3 is provided with an exhaust duct (a tail pipe) 8, through which the exhaust gas is discharged.

The exhaust-gas cleaning device 1 is interposed between the inlet side silencer 2 and the outlet side silencer 3 to thereby constitute a standard muffler shown in FIG. 6 and FIG. 7, that is, a muffler having an exhaust-gas cleaning function. The exhaust-gas cleaning device 1 contains a DPF (Diesel Particulate Filter) 1*a* and a DOC (Diesel Oxidation Catalyst) 1*b*, which are exhaust gas cleaning materials. In the standard muffler, the exhaust-gas cleaning device 1 removes a PM (Particulate Matter) and the like included in the exhaust gas received in the inlet side silencer 2.

The exhaust-gas cleaning device 1 includes a cylindrical body that houses the DPF 1*a* and the DOC 1*b*. The cylindrical body has an axial length dimension W1. The cylindrical body includes an inlet side end and an outlet side end located on axially opposite sides, respectively, each end surrounding an opening. The inlet side end and the outlet side end are provided with a flange 4 and a flange 5, respectively, the flanges 4 and 5 projecting radially outward beyond the other portion. The inlet side silencer 2 and the outlet side silencer 3 are provided with a flange 6 and a flange 7, respectively, wherein the flange 4 is detachably coupled to the flange 6 through bolts 41 and the flange 5 is detachably coupled to the flange 7 through bolts 42. Thus, the flange 4 configures a first inlet side coupling section to be coupled to the inlet side silencer 2 by the bolts 41 as couplers and the flange 5 configures a first outlet side coupling section to be coupled to the outlet side silencer 3 by the bolts 42 as couplers.

The first to fourth embodiments entirely share the exhaust-gas cleaning device 1, the inlet side silencer 2, and the outlet side silencer 3. On the other hand, respective specific structures of the intermediate members 11 according to the embodiments are different from one another, while each satisfying the following common conditions A to D.

Condition A: The intermediate member 11 includes no exhaust gas cleaning material and allows the exhaust gas received in the inlet side silencer 2 to directly reach the outlet side silencer 3 without passing through the exhaust gas cleaning material in a state where the intermediate member 11 is interposed between the inlet side silencer 2 and the outlet side silencer 3.

Condition B: The intermediate member 11 includes a resistance generation section that generates ventilation resistance for providing the intermediate member 11 with exhaust resistance substantially equivalent to the exhaust resistance of the exhaust-gas cleaning device 1 in the standard muffler.

Condition C: The intermediate member 11 includes respective flanges 12 and 13 corresponding to the flanges 4 and 5 provided at opposite ends of the exhaust-gas cleaning device 1. The flange 12 configures a second inlet side coupling section capable of being detachably coupled to the flange 6 by the bolts 41 (couplers same as the couplers for the coupling) for coupling the flange 4 and the flange 6 of the inlet side silencer 2. The flange 13 configures a second inlet side coupling section capable of being detachably coupled to the flange 7 by the bolts 42 (couplers same as the couplers for the coupling) for coupling the flange 5 and the flange 7 of the inlet side silencer 3.

Condition D: The intermediate member 11 has a length dimension W2 substantially equal to the length dimension W1 of the exhaust-gas cleaning device 1.

Note that "providing the intermediate member 11 with exhaust resistance substantially equivalent to the exhaust resistance of the exhaust-gas cleaning device 1 in the standard muffler" in the condition B means to make the exhaust resistance of the exhaust-gas cleaning device 1 and the exhaust resistance of the intermediate member 11 in the standard muffler be substantially equivalent to each other on the premise that the exhaust-gas cleaning device 1 and the intermediate member 11 are used in the same engine.

Next will be explained the specific structure of the intermediate members 11 according to the embodiments.

Figure 1:
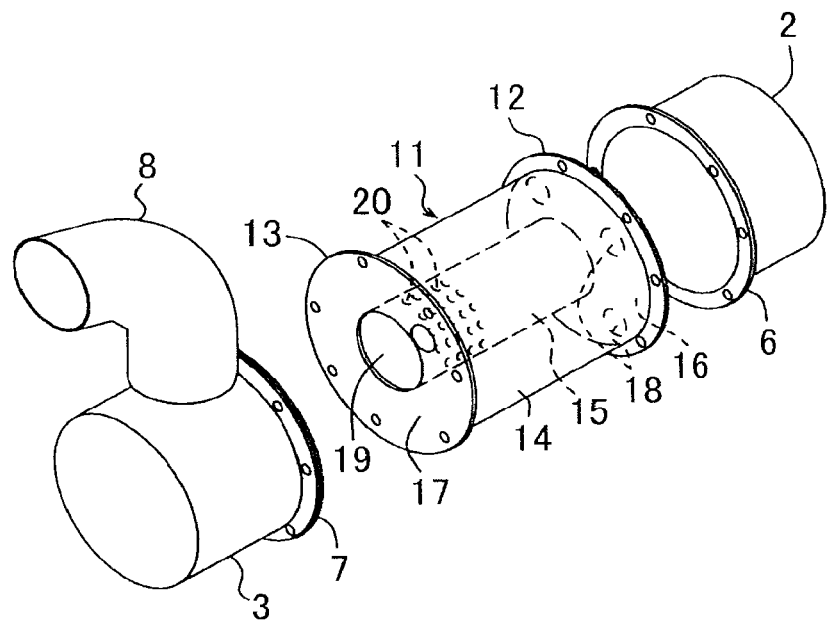
FIG. 1 is an exploded perspective view of a muffler according to a first embodiment of the present invention.
Figure 2:
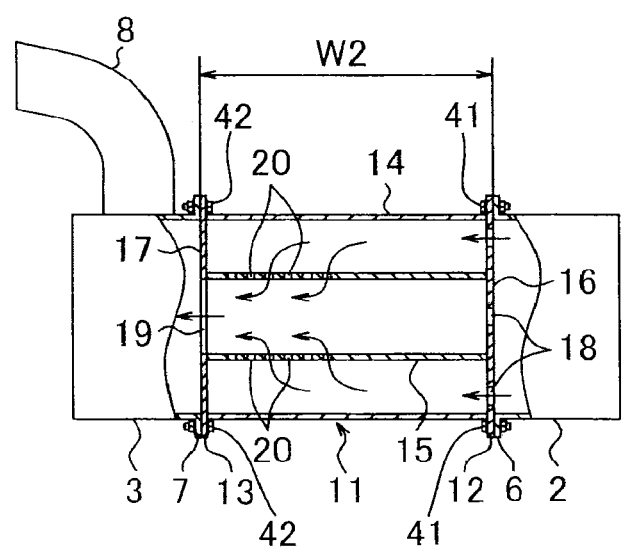
FIG. 2 is a partial sectional front view showing a state in which an intermediate member is incorporated in the muffler according to the first embodiment of the present invention.

FIG. 1 and FIG. 2 show a muffler according to the first embodiment into which the intermediate member 11 is incorporated. The intermediate member 11 according to the first embodiment includes a cylindrical outer tube 14, a cylindrical inner tube 15 having an outer diameter smaller than the inner diameter of the outer tube 14, and end plates 16 and 17. The outer tube 14 and the inner tube 15 are concentrically disposed to form a double cylinder. The end plates 16 and 17 partially close an inlet side opening and an outlet side opening of the outer tube 14, respectively. The end plates 16 and 17 include respective outer circumferential portions projecting radially outward beyond the outer circumferential surface of the outer tube 14, in respective flange shapes, the outer circumferential portions configuring the flanges 12 and 13, that is, the second inlet side coupling section and the second outlet side coupling section, respectively. Pluralities of bolt through-holes arranged in the circumferential direction are provided in the flanges 12 and 13. The bolts 41 and 42 are inserted through the bolt through-holes. The flanges 12 and 13 may be configured by respective ring-like members separate from the end plates 16 and 17 instead of the outer circumferential portions of the end plates 16 and 17. The ring-like members, for example, can be fixed to the outer circumference of the outer tube 14 by welding or the like.

The end plate 16, that is, an inlet side end plate adjacent to the inlet side silencer 2, includes a plurality of exhaust gas inlets 18. The exhaust gas inlets 18 are formed of respective circular through-holes in the center portion of the end plate 16 and around the center portion. The end plate 17, that is, an outlet side end plate, includes an exhaust gas outlet 19. The exhaust gas outlet 19 is formed of a through-hole located in the center portion of the end plate 17, the through-hole having a circular shape coincident with the opening of the outlet side end portion of the inner tube 15.

The inner tube 15 includes a large number of exhaust-gas circulation holes 20. The exhaust-gas circulation holes 20 are provided in a circumferential wall in the outlet-side half of the inner tube 15 and spaced axially and circumferentially of the inner tube 15.

The outer tube 14, the inner tube 15 including the exhaust-gas circulation holes 20, and the end plates 16 and 17 including the exhaust gas inlets 18 and the exhaust gas outlet 19, respectively, constitute the resistance generation section. Specifically, the exhaust gas introduced into the inlet side silencer 2 is introduced into the outer tube 14 and the inner tube 15 through the exhaust gas inlets 18, and a part of the exhaust gas enters the outlet side silencer 3 from the inner tube 15 through the exhaust gas outlet 19 directly, while the remainder of the exhaust gas enters the outlet side silencer 3 through the exhaust gas outlet 19 after its movement from the outer tube 14 into the inner tube 15 through the exhaust-gas circulation holes 20. The resistance generation section applies to the exhaust gas a resistance substantially equivalent to the resistance which the exhaust gas receives when passing through the exhaust-gas cleaning device 1 in this route of the exhaust gas. In other words, the diameters of the outer tube 14 and the inner tube 15 and the opening areas of the exhaust gas inlets 18, the exhaust gas outlet 19, and each of the exhaust-gas circulation holes 20 are adjusted so as to generate such exhaust resistance.

The muffler achieves effects explained below.

i) Exchange between the exhaust-gas cleaning device 1 and the intermediate member 11 enables both of the standard muffler and a muffler adapted to exhaust gas non-regulation and having exhaust resistance equal to the exhaust resistance of the standard muffler to be constructed. In addition, the intermediate member 11 having the exhaust resistance equal to that of the exhaust-gas cleaning device 1 generates no possibility of causing function failures such as silencing function deterioration or a change in an engine output, even in the use in the engine adapted to the exhaust gas regulation. In summary, the muffler can be adapted to the exhaust-gasnon-regulation machine at low cost while allowing the engine adapted to the exhaust gas regulation to be used.

ii) The exhaust-gas cleaning device 1 and the intermediate member 11, which are coupled to the silencers 2 and 3 by the same flange coupling using the same bolts 41 and 42, respectively, allow attachment and detachment of the exhaust-gas cleaning device 1 and the intermediate member 1, that is, change of the muffler 1, to be easily performed.

iii) The equivalence of the length dimension W1 of the exhaust-gas cleaning device 1 and the length dimension W2 of the intermediate member 11 allows the total length of the muffler to be constructed and the total length of the muffler adapted to exhaust gas non-regulation to be substantially equal to each other. This eliminates the need for change or remodel of the layout of the engine and peripheral devices of the engine. Furthermore, if the diameter of the intermediate member 11 is set to one equal to the diameter of the exhaust-gas cleaning device 1 on the premise that the exhaust resistances of the exhaust-gas cleaning device 1 and the intermediate member 11 are set substantially the same, it is possible to give substantially the same external shapes to the muffler adapted to exhaust gas non-regulation and the standard muffler, involving no sense of discomfort in external appearance.

iv) The intermediate member 11 can also have a function of silencing through repetition of expansion/contraction of the exhaust gas inside the double cylinder including the outer tube 14 and the inner tube 15.

v) The intermediate member 11 allows the above-described effect to be obtained with a simple structure, namely, the double tube including the plurality of holes, that is, a structure having a small weight and being at low cost.

Shifting to a mode for adaption to exhaust gas non-regulation is allowed by, for example, detaching the exhaust-gas cleaning device 1 and directly coupling the inlet side and outlet side silencers 2 and 3 each other; however, this reduces the exhaust resistance of the entire muffler by the exhaust resistance of the exhaust-gas cleaning device 1 to thereby reduce engine backpressure. This may cause functional failures, for example, deterioration in the silencing function, change in an engine output, and/or over-rotation in an engine with a supercharger. The intervention of the intermediate member 11 in place of the exhaust-gas cleaning device 1 enables the muffler to be shifted to the mode for adaption to the exhaust gas non-regulation without involving inconveniences as above mentioned.

Figure 3:
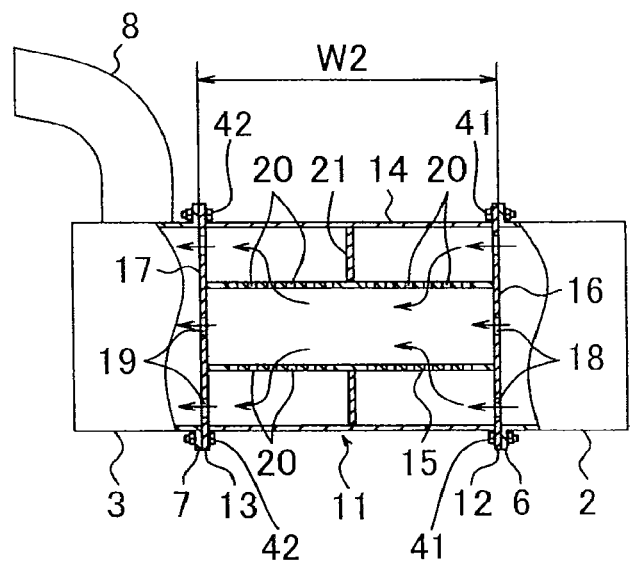
FIG. 3 is a partial sectional front view showing a state in which an intermediate member is incorporated in a muffler according to a second embodiment of the present invention.

FIG. 3 shows the muffler according to the second embodiment into which the intermediate member 11 is incorporated. The intermediate member 11 according to the second embodiment includes a partition wall 21 in addition to the components of the intermediate member 11 according to the first embodiment. The partition wall 21 is provided in an axially intermediate portion of the intermediate member 11 to partition a space between the outer tube 14 and the inner tube 15 into an inlet side space and an outlet side space. The exhaust-gas circulation holes 20 of the inner tube 15 are distributed to both sides of the partition wall 21.

Furthermore, differently from the first embodiment, the intermediate member 11 according to the second embodiment includes a plurality of exhaust gas outlets 19, which are distributed to the center portion of and around the outlet side end plate 17 in the arrangement similar to that of the exhaust gas inlets 18, The intermediate member 11 according to the second embodiment, wherein symmetrical exhaust resistances are generated in the inlet side space and the outlet side space on both the sides of the partition wall 21, respectively, is suitable for an engine requiring particularly high exhaust resistance.

Figure 4:
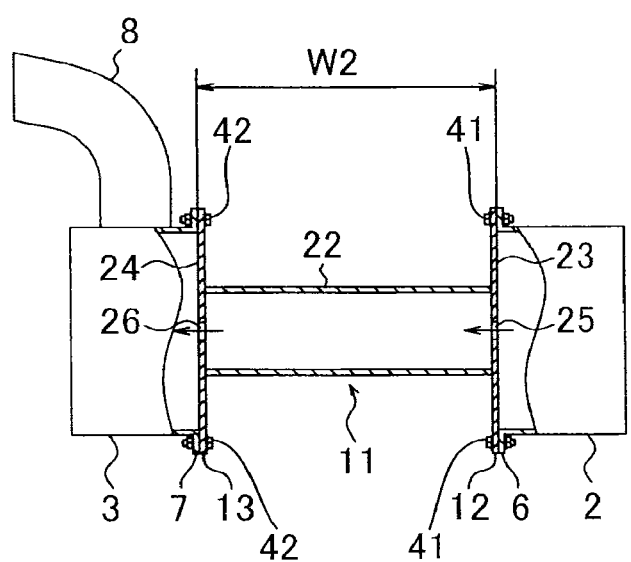
FIG. 4 is a partial sectional front view showing a state in which an intermediate member is incorporated in a muffler according to a third embodiment of the present invention.

FIG. 4 shows a muffler according to the third embodiment into which the intermediate member 11 is incorporated. The intermediate member 11 according to the third embodiment includes a tubular main body 22 having a smaller diameter than that of the inlet side and outlet side silencers 2 and 3 and respective end plates 23 and 24 closing an inlet side opening and an outlet side opening of the main body 22. Similarly to the end plates 16 and 17 according to the first and second embodiments, the end plates 23 and 24 include outer circumferential portions projecting in a flange shape radially outward beyond the outer circumferential surface of the main body 22 to form respective flanges 12 and 13. The inlet side end plate 23 includes an exhaust gas inlet 25, which is a circular hole piercing through the center portion of the inlet side end plate 23. The outlet side end plate 24 includes an exhaust gas outlet 26, which is a circular hole piercing through the center portion of the outlet side end plate 24.

In the intermediate member 11 according to the third embodiment, a flow passage for exhaust gas is narrowed at the exhaust gas inlet 25, the exhaust gas outlet 26, and the small-diameter main body 22, thereby generating exhaust resistance. This makes it possible to generate exhaust resistance substantially equal to the exhaust resistance of the exhaust-gas cleaning device 1 with an extremely simple structure, allowing the intermediate member 11 to have further reduced weight and to be at lower cost. The intermediate member 11, which allows the exhaust resistance thereof to be adjusted by setting of the diameter of the main body 22 and the opening areas of the exhaust gas inlet 25 and the exhaust gas outlet 26, is particularly suitable for an engine requiring only small exhaust resistance.

Figure 5:
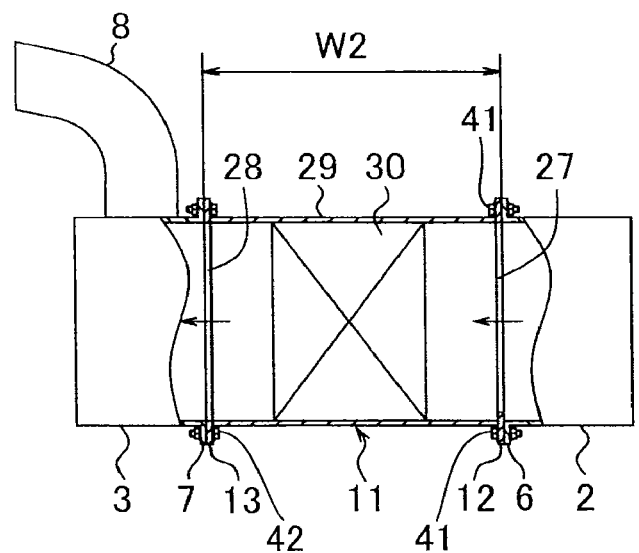
FIG. 5 is a partial sectional front view showing a state in which an intermediate member is incorporated in a muffler according to a fourth embodiment.

FIG. 5 shows the muffler according to the fourth embodiment into which the intermediate member 11 is incorporated. The intermediate member 11 according to the fourth embodiment includes a tubular main body 29 including an exhaust gas inlet 27 and an exhaust gas outlet 28 and a silencing member 30 such as glass wool provided in the main body 29. The silencing member 30 functions as a resistance generation section. The main body 29 is tubular to have axially opposite ends forming respective openings corresponding to the exhaust gas inlet 27 and the exhaust gas outlet 28. The intermediate member 11, however, may be provided with respective end plates forming circular exhaust gas inlet and outlet similarly to the first to third embodiments.

The structure of the intermediate member 11 is simpler, having a smaller weight and being at lower cost. In addition, setting of exhaust resistance and adjustment of silencing performance of the entire muffler can be made by selection of the material, the density, and the like of the silencing member.

The present invention is not limited to the embodiments explained above, encompassing, for example, the following embodiments.

(1) The present invention is not limited to the inlet member and the outlet member each forming the silencer as in the embodiments. The inlet member may be, for example, a member forming a room for diffusing the exhaust gas introduced into the inlet member. The outlet member may be a member forming a room for smooth discharge of the exhaust gas.

(2) The couplers that couple the inlet member to the exhaust-gas cleaning device and the intermediate member and the couplers that couple the outlet member, to the exhaust-gas cleaning device and the intermediate member according to the present invention are not limited to the bolts that fasten the flanges as in the embodiments. For example, the detachable coupling of the inlet member, the exhaust-gas cleaning device, and the intermediate member and the detachable coupling of the outlet member, the exhaust-gas cleaning device, and the intermediate member can be performed through couplers including: respective flanges formed in respective end portions of the inlet member, the outlet member, the exhaust-gas cleaning device, and the intermediate member; a fastening band wound between flanges butted against each other in a state in which a seal member is interposed between both the flanges, and a bolt or a latch-type fastener that locks the end portion of the fastening band. Alternatively, each of the inlet member, the outlet member, the exhaust-gas cleaning device, and the intermediate member may have a cylindrical shape and include no flange while having ends capable of fitting with one another via seal members (e.g., simple inside/outside fitting, desirably, faucet fitting). In this case, fixing of the fitting portions can be performed by, for example, fastening by the fastening band. It is also possible to apply the coupling by the fitting to one of the inlet member and the outlet member while applying coupling by use of the flanges to the other (coupling by fastening of the bolts of the flanges or winding of the fastening band on the flanges).

(3) A construction machine to which the muffler according to the present invention can be applied is not limited to the shovel. The present invention can be widely applied to construction machines that require, concerning the muffler, switching of the mode including the exhaust-gas cleaning function and the mode corresponding to the exhaust-gas-non-regulation machine.

As explained above, it is an object of the present invention to provide a muffler for a construction machine, the muffler being switchable between a state having an exhaust-gas cleaning function and a state adaptable to an exhaust-gas-non-regulation machine while keeping an engine adapted to an exhaust gas regulation be usable. The muffler provided by the present invention includes: an inlet member that receives exhaust gas from an engine; an outlet member that discharges the exhaust gas received by the inlet member; an exhaust-gas cleaning device including an exhaust gas cleaning material having a function of cleaning the exhaust gas, the exhaust-gas cleaning device including a first inlet side coupling section and a first outlet side coupling section capable of being detachably coupled to the inlet member and the outlet member, respectively, by couplers, in such respective positions that the exhaust-gas cleaning device is interposed between the inlet member and the outlet member so as to allow the exhaust gas in the inlet member to flow to the outlet member through the exhaust gas cleaning material; and an intermediate member other than the exhaust-gas cleaning device, the intermediate member including a second inlet side coupling section and a second outlet side coupling section capable of being detachably coupled to the inlet member and the outlet member, respectively, by couplers same as the couplers, in such respective positions that the intermediate member is interposed, in place of the exhaust-gas cleaning device, between the inlet member and the outlet member. The intermediate member is a tubular body that allows the exhaust gas in the inlet member to flow directly to the outlet member without passing through the exhaust gas cleaning material in a state in which the second inlet side coupling section and the second outlet side coupling section are connected to the inlet member and the outlet member, respectively. The intermediate member includes a resistance generation section that generates ventilation resistance so as to provide the intermediate member with exhaust resistance substantially equivalent to exhaust resistance of the exhaust-gas cleaning device.

Only through exchange between the exhaust-gas cleaning device and the intermediate member between the inlet member and the outlet member, the muffler can be switched between a muffler having an exhaust-gas cleaning function and a muffler adapted to exhaust gas non-regulation and having exhaust resistance substantially equal to the exhaust resistance in this mode. Moreover, the intermediate member having the exhaust resistance equivalent to the exhaust resistance of the exhaust-gas cleaning device does not involve function failures such as silencing function deterioration or a change in an engine output, even in use for the engine adapted to the exhaust gas regulation. Thus, it is possible to adapt the muffler to the exhaust gas regulation machine at low cost while allowing the engine adapted to the exhaust gas regulation to be used as it is. Besides, the exhaust-gas cleaning device and the intermediate member, which are coupled to the inlet member and the outlet member, respectively, by the same couplers, allow attachment and detachment work for switching of the mode of the muffler to be easy.

The exhaust-gas cleaning device and the intermediate member desirably have respective axial length dimensions substantially equal to each other. This allows respective total lengths of the muffler in both the modes to be substantially equal to each other to eliminate the need for changing a layout of the engine and peripheral devices of the engine or remodel thereof.

Furthermore, the exhaust-gas cleaning device and the intermediate member, if having respective diameters substantially equal to each other, enable respective external shapes of the muffler in both the modes to be substantially the same, thus involving no sense of discomfort in external appearance.

The intermediate member is suitable when including, for example, an outer tube including an inlet side opening and an outlet side opening in opposite ends, an inner tube disposed inside the outer tube and concentrically with the outer tube, an inlet side end plate closing the inlet side opening of the outer tube, and an outlet side end plate closing the outlet side opening of the outer tube, the inlet side end plate including an exhaust gas inlet, the outlet side end plate including an exhaust gas outlet, and the inner tube including a circumferential wall including a plurality of exhaust-gas circulation holes. In the intermediate member, the exhaust gas receives exhaust resistance when passing through the exhaust gas inlet, the exhaust-gas circulation holes, a space between the inner tube and the outer tube, a space inside the inner tube, and the exhaust gas outlet. The inner tube and the inlet side and outlet side end plates thus constitute an effective resistance generation section. In addition, adjustment of an opening area of at least one of the exhaust gas inlet, the exhaust gas outlet, and the exhaust-gas circulation holes enable proper exhaust resistance matching the engine to be generated. Besides, the repetition of expansion/contraction of the exhaust gas between the outer tube and the inner tube produces silencing action. Moreover, the effect explained above can be achieved by a simple structure of a double cylinder structure including holes, which allows the intermediate member to have reduced weight and to be low cost.

It is more preferable that the intermediate member further includes a partition wall located in an axially intermediate portion of the intermediate member and partitioning a space between the outer tube and the inner tube into an inlet side space and an outlet side space, the plurality of exhaust-gas circulation holes being distributed on both sides of the partition wall. This arrangement of the exhaust-gas circulation holes enables symmetrically generate exhaust resistances to be caused on both the sides of the partition wall, thus making it possible to provide a muffler suitable for an engine requiring high exhaust resistance.

Alternatively, the intermediate member may include a tubular main body having a smaller diameter than that of the inlet member and the outlet member and having opposite ends forming an inlet side opening and an outlet side opening, respectively, and an inlet side end plate and an outlet side end plate that close the inlet side opening and the outlet side opening of the main body, respectively, the inlet side end plate including an exhaust gas inlet formed of a through-hole located in the center portion of the inlet side end plate, the outlet side end plate including an exhaust gas outlet formed of a through-hole located in the center portion of the outlet side end plate.

In the intermediate member, the main body and the inlet side and outlet side end plates can constitute an effective resistance generation section narrowing a flow passage for the exhaust gas with the small diameter of the main body and the exhaust gas inlet and the exhaust gas outlet. Thus, the intermediate member includes the resistance generation section having an extremely simple structure, thereby being allowed to have further reduced weight and to be at lower cost. Besides, the exhaust resistance in the intermediate member can be adjusted through setting the diameter dimension of the main body and the opening areas of the exhaust gas inlet and outlet. The configuration of the intermediate member makes it possible to provide a muffler suitable for an engine requiring only a small exhaust resistance.

It is also possible that the inlet side and outlet side end plates include respective outer circumferential portions each projecting in a flange shape radially outward beyond the main body, the outer circumferential portions forming respective flanges which are the second inlet coupling section and the second outlet coupling section. In summary, the second inlet coupling section and the second outlet coupling section can be constructed by utilization of respective outer circumferential sections of the inlet side and outlet side end plates.

Alternatively, it is also possible that the intermediate member includes a tubular main body having an exhaust gas inlet and an exhaust gas outlet and the resistance generation section is a silencing member provided inside the main body. The utilization of the silencing member as the resistance generation section allows the intermediate member to have a simple structure and a reduced weight and be at lower cost. Besides, both of setting of exhaust resistance and adjustment of silencing performance of the entire muffler can be performed by selection of the material, the density, and the like of the silencing member.

The invention claimed is:

1. A muffler for a construction machine comprising:
   an inlet member that receives exhaust gas from an engine;
   an outlet member that discharges the exhaust gas received by the inlet member, the inlet member and the outlet member allowing one of an exhaust-gas cleaning device and an intermediate member other than the exhaust-gas cleaning device to be interposed between the inlet member and the outlet member,
   the exhaust-gas cleaning device including an exhaust gas cleaning material having a function of cleaning the exhaust gas, the exhaust-gas cleaning device including a first inlet side coupling section and a first outlet side coupling section capable of being detachably coupled to the inlet member and the outlet member, respectively, by device couplers, in such respective positions that the exhaust-gas cleaning device is interposed between the inlet member and the outlet member so as to allow the exhaust gas in the inlet member to flow to the outlet member through the exhaust gas cleaning material;
   the intermediate member other than the exhaust-gas cleaning device including a second inlet side coupling section and a second outlet side coupling section capable of being detachably coupled to the inlet member and the outlet member, respectively, by the device couplers between the inlet member and the outlet member, the intermediate member being a tubular body that allows the exhaust gas in the inlet member to flow directly to the outlet member without passing through the exhaust gas cleaning material in a state in which the second inlet side coupling section and the second outlet side coupling section are connected to the inlet member and the outlet member, respectively, the intermediate member including a resistance generation section that generates ventilation resistance so as to provide the intermediate member with exhaust resistance substantially equivalent to exhaust resistance of the exhaust-gas cleaning device, wherein the resistance generation section comprises:
   the intermediate member including an outer tube including an inlet side opening and an outlet side opening in opposite ends, respectively; an inner tube disposed inside the outer tube and concentrically with the outer tube; an inlet side end plate closing the inlet side opening of the outer tube; and an outlet side end plate closing the outlet side opening of the outer tube, the inlet side end plate including an exhaust gas inlet, the outlet side end plate including an exhaust gas outlet, and the inner tube including a circumferential wall including a plurality of exhaust-gas circulation holes; and
   the intermediate member further including a partition wall located in an axially intermediate portion of the intermediate member and connected to the inner tube to partition a space between the outer tube and the inner tube into an inlet side space and an outlet side space, the partition wall being connected to both of the outer tube and the inner tube, to extend from the outer tube to the inner tube, the plurality of exhaust-gas circulation holes being distributed on both sides of the partition wall.

2. The muffler for a construction machine according to claim 1, wherein the exhaust-gas cleaning device and the intermediate member have respective axial length dimensions equal to each other.

3. The muffler for a construction machine according to claim 1, wherein the intermediate member includes a tubular main body having an exhaust gas inlet and an exhaust gas outlet, and the resistance generation section is a silencing member provided inside the main body.

4. A muffler for a construction machine, comprising:
   an inlet member that receives exhaust gas from an engine;
   an outlet member that discharges the exhaust gas received by the inlet member, the inlet member and the outlet member allowing one of an exhaust-gas cleaning device and an intermediate member other than the exhaust-gas cleaning device to be interposed between the inlet member and the outlet member, the exhaust-gas cleaning device including an exhaust gas cleaning material having a function of cleaning the exhaust gas, the exhaust-gas cleaning device including a first inlet side coupling section and a first outlet side coupling section capable of being detachably coupled to the inlet member and the outlet member, respectively, by device couplers, in such respective positions that the exhaust-gas cleaning device is interposed between the inlet member and the outlet member so as to allow the exhaust gas in the inlet member to flow to the outlet member through the exhaust gas cleaning material;

the intermediate member other than the exhaust-gas cleaning device including a second inlet side coupling section and a second outlet side coupling section capable of being detachably coupled to the inlet member and the outlet member, respectively, by the device couplers between the inlet member and the outlet member, the intermediate member being a tubular body that allows the exhaust gas in the inlet member to flow directly to the outlet member without passing through the exhaust gas cleaning material in a state in which the second inlet side coupling section and the second outlet side coupling section are connected to the inlet member and the outlet member, respectively, the intermediate member including a resistance generation section that generates ventilation resistance so as to provide the intermediate member with exhaust resistance substantially equivalent to exhaust resistance of the exhaust-gas cleaning device, wherein the resistance generation section comprises the intermediate member including a main body having a tubular shape with a diameter smaller than respective diameters of the inlet member and the outlet member and having opposite ends forming an inlet side opening and an outlet side opening, respectively, and an inlet side end plate and an outlet side end plate closing the inlet side opening and the outlet side opening of the main body, respectively, the inlet side end plate including an exhaust gas inlet formed of a through-hole located in a center portion of the inlet end plate and the outlet side end plate including an exhaust gas outlet formed of a through-hole located in a center portion of the outlet side plate.

5. The muffler for a construction machine according to claim 4, wherein the inlet side and outlet side end plates include respective outer circumferential portions projecting in a flange shape radially outward beyond the main body, the outer circumferential portions configuring respective flanges which are the second inlet coupling section and the second outlet coupling section, respectively.

6. The muffler for a construction machine according to claim 4, wherein the intermediate member includes a tubular main body having an exhaust gas inlet and an exhaust gas outlet, and the resistance generation section is a silencing member provided inside the main body.

* * * * *